June 24, 1941.  H. J. FINDLEY  2,247,227
VALVE FOR AUTOMOTIVE VEHICLE HEATERS
Filed Sept. 23, 1939
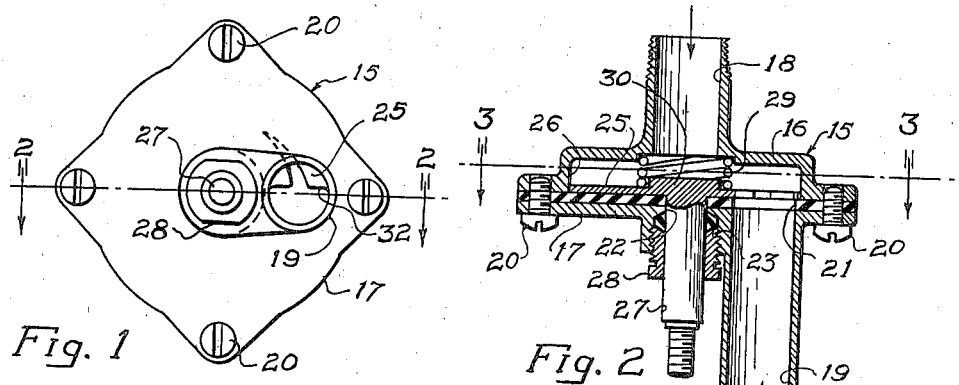
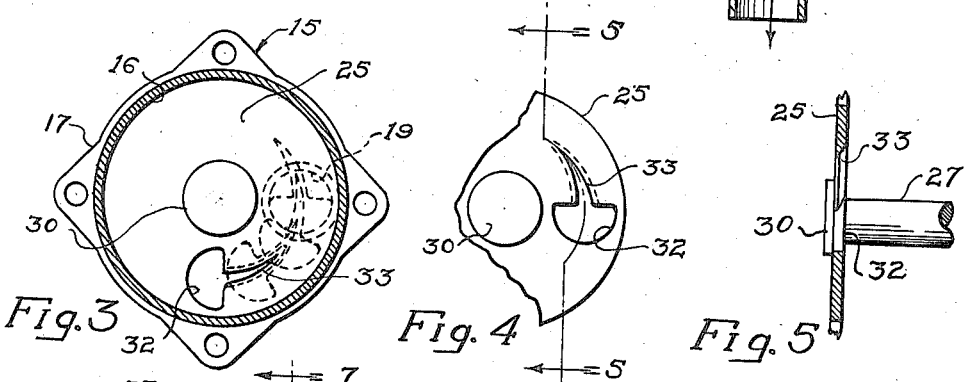
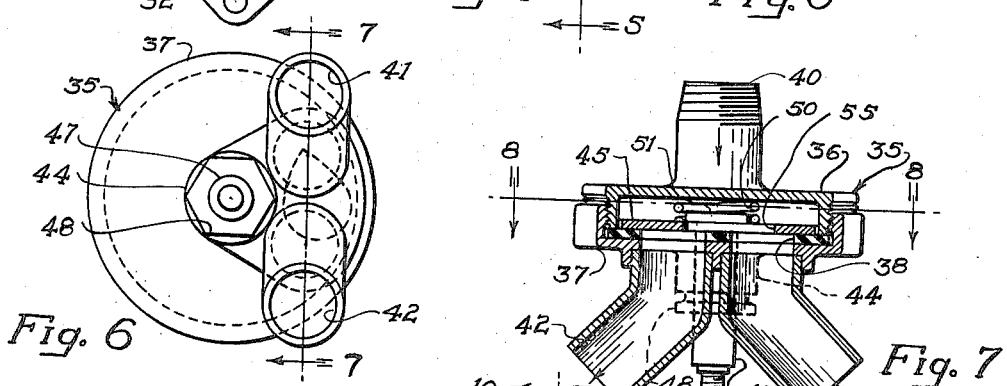
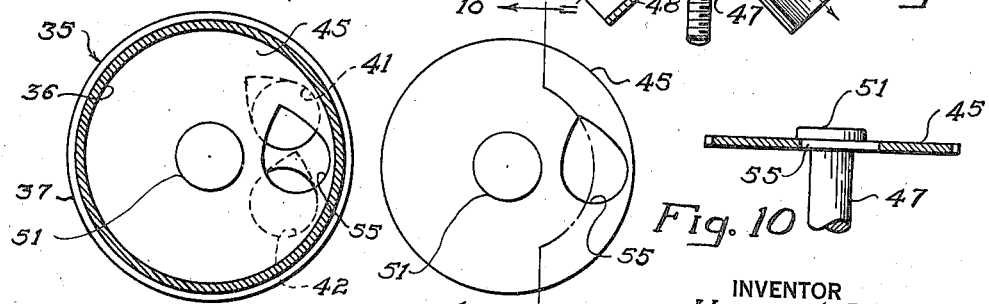
INVENTOR
HOWARD J. FINDLEY
BY John F. Stark
ATTORNEY Patented June 24, 1941

2,247,227

UNITED STATES PATENT OFFICE 2,247,227

VALVE FOR AUTOMOTIVE VEHICLE HEATERS

Howard J. Findley, Euclid, Ohio, assignor to Eaton Manufacturing Company, Cleveland, Ohio, a corporation of Ohio Application September 23, 1939, Serial No. 296,196

1 Claim. (Cl. 251—86)

This invention relates to control valves for fluid systems in general, and more particularly is concerned with a throttle valve for automotive vehicle passenger compartment heaters utilizing the heat in the liquid of the engine cooling system.

Heaters of the kind referred to consist of a radiator core for the passage of hot water or other liquid therethrough and have means, such as an electric fan, or other air intake means operable in response to forward motion of the vehicle, for induction of fresh air into and through the core to abstract the heat from the liquid for heating the car. One matter that has received considerable attention in connection with these heaters is that of accurately modulating the heat so as to avoid discomfort in moderate weather, and especially to control the temperature of the heated air delivered to the car body regardless of car speed so as to maintain a substantially constant temperature therein. Thus far, two methods of control have been proposed. One method is to control the speed of the fan by a suitable rheostat or plural speed switch, two speeds being most commonly used. The objection to that method is that it does not permit of as sensitive adjustment as desired, nor does it afford the desired range of variation, in fact the temperature of the air is not altered at all, only the total volume is controlled. The other method is that of regulating the flow of air by means of baffles on the delivery face of the heater, but that again has been objected to as not affording quite the range of variation desired and involves complicated constructions and proportionate expense, in reality baffle means only throttle total volume of air delivered. It is, therefore, the primary object of the present invention to make it practical to accurately control the temperature of the air from the face of the heater by regulating the volume of the flow of the heat laden liquid anywhere from zero to maximum flow, whereby to secure exactly the air temperature desired at the face of the heater without tampering with the fan or having to manipulate baffles. It is known that heaters of this kind have been provided with an ordinary shut-off or throttle valve in the inlet pipe connection under the vehicle hood. But this necessitates raising the hood to get at the same whenever it is desired to connect or disconnect the heater or regulate the flow of the liquid therethrough, and in some instances the device cannot be made easily accessible. Naturally, too, such control was more or less ineffectual because it could not be made from the driver's seat, that is, it was not a direct form of control and when an adjustment of the valve was made, it was merely a matter of guesswork as to the result thereby obtained.

More particularly, according to the present invention the ordinary shut-off valve usually located under the hood is eliminated and in place thereof is provided a new and novel valve structure including a very distinctive and sensitive orifice design, in so far as this applicant knows, and which may be accurately controlled from the interior of the front compartment of the vehicle.

Other objects of the invention include the provision of a fluid system valve comprising in part two abutting apertured flat valve plates, one adapted to be rotated relative to the other, so as to cause the apertures in each to be in and out of registration with each other for regulation of fluid flow therethrough; the provision in a valve structure as above described of an adjustable plate valve member having an orifice of substantial size assuming a semicircular form having an arcuately extending relatively reduced tail portion of tapering conformation in communication therewith; the provision in a rotatable valve structure as above described of a disc valve member having a metering orifice therethrough adjustable from open to closed position, comprising a round nose port in the open position and reduced down to a converging tapered tail portion in the closed position, both in the longitudinal length of the port and in the thickness of the disc member; the provision of a separable valve structure as above described including a flow adjustment means, providing a highly accurate and finely controlled fluid flow over a relatively limited adjustment range.

Other objects of the invention include the provision of a two way or by-pass valve device incorporating the features of the valve structure above described in a novel compact valve body having a remote control means associated therewith.

The present invention is characterized by other and further advantages which reside in the novel combination and arrangement of parts as will hereinafter be apparent as the description progresses when considered in conjunction with the accompanying drawing forming a part of this specification, in which like reference characters designate like parts in the several views and in which:

Fig. 1 illustrates a plan view of one form of valve embodying the present invention; and Fig. 2 is a vertical diametrical sectional view of the valve as on the line 2—2 of Fig. 1; and Fig. 3 is a sectional plan view of the valve as on the line 3—3 of Fig. 2; and Fig. 4 is a plan view of a portion of one of the valve plates removed from Fig. 3; and Fig. 5 is a sectional view of the valve plate of Fig. 4 as on the broken line 5—5 thereof; and Fig. 6 is a plan view of a two way valve embodying the features of the present invention; and Fig. 7 is a vertical sectional view through the valve structure of Fig. 6 as on the line 7—7 thereof; and Fig. 8 is a sectional plan view of the valve structure as on the line 8—8 of Fig. 7; and Fig. 9 is a plan view of one of the plate valve discs removed from the valve structure of Fig. 7; and Fig. 10 is a sectional view of the plate valve of Fig. 9 as on the broken line 9—9 thereof.

In the drawing Figs. 1 to 5, inclusive, is shown a valve structure generally designated 15, which may be used on vehicle heaters or other fluid circulating systems in which an accurate control of the fluid therethrough is desired for certain operating conditions. The valve 15 may comprise separable body portions 16 and 17 forming inlet and outlet sections, respectively, with like conduits 18 and 19 extending therefrom. The said body portions are secured together by any suitable fastening means, for example, the threaded screws 20, and a suitably apertured sealing gasket 21 intermediate the body portions provides a water tight seal around the outer periphery thereof, the gasket being preferably composed of a synthetic rubber or other sulphur-free elastic material which will not bond to the overlying metallic valve plate, and not distort when subjected to radiator anti-freeze or anti-rust solution. Axially located within the body portion 17 is an aperture 22 including an integral depending internally threaded sleeve section 23. An annular movable valve plate 25 is slidably fitted within an annular pocket 26, of the body portion 16, and an integral axially depending stem portion 27 is introduced through the opening 22. A packing nut 28 slidably fitted over the valve stem 27 is threaded into the sleeve section 23 providing a water tight seal in conjunction with a packing material therein. A coil spring 29, seated at one end in a pocket in the body portion 16 and at the opposite end around an aligned axial projection 30 on the upper face of the valve plate 25, is assisted by the pressure of the water and constantly urges the valve plate against the underlying gasket 21 and provides the necessary guiding means for rotation of the valve and slight resistance to accidental displacement from the adjusted position. Obviously, if desired, the valve 25 and integral stem 27, as shown, may be formed separately and secured in proper relation to each other by any suitable means such as threading or riveting, in which case a rivet or bolt head would serve as a guide for the spring in place of the projection 30.

In the movable valve plate 25 is an orifice 32, as best shown in Figs. 3 or 4, which has so far as this applicant knows, a unique conformation. The shape of the orifice 32, may be described as being composed of a semicircular nose portion and an arcuately extending tail portion 33 having converging side walls which have a beveled face along the length thereof and are undercut a portion of the way through the cross section of the valve plate 25 beyond the through portion of the pointed tail, as best shown in Fig. 5. The dotted illustrations of the valve orifice in Fig. 3, showing the different positions the valve plate 25 may assume in rotation relative to the mouth of outlet conduit 19, illustrates the exceptionally fine metered control that may be obtained over the fluid flow in a relatively short angular rotation of the valve of approximately 90°. When the semicircular nose of the valve orifice is in full registration with the mouth of outlet conduit 19 substantially the full fluid capacity of the conduit may be handled, which in this instance has been made to correspond to the usual size of vehicle heater hose and conduits. The valve stem 27 has a threaded section on the outer end thereof to which may be suitably secured an extension of an actuating lever for direct operation of the valve or a fitting for reception of a conventional Bowden wire control for remote control of the valve.

As aforementioned the valve structure 15 may be located under the vehicle hood if sufficient room is not available for the installation of both the heater and the associated valve structure in the front compartment of the vehicle. When this form of installation is used the valve stem 27, by means of the threaded section on the end thereof, may be secured to a cooperatively threaded fastening means on the end of a Bowden wire the opposite end of which may be located in the front compartment of the vehicle conveniently accessible from the driving position for ready manipulation and adjustment by the driver. In certain instances it may be advisable to remove a portion of the inlet pipe to the heater and join the valve structure in series therewith before the heater is mounted in the usual position through the dash board. In this installation the threaded end of the valve stem 27 may be so disposed as to be directly secured to a cooperatively threaded actuating lever extending along one of the edges of the heater body from adjacent the back to the front face thereof where it may terminate in a suitable control knob and associated dial for conveniently adjusting the valve to the several positions available.

In operation, the rotatable valve disc 25 and associated valve stem 27 may be adjusted by either the direct or remote control means just described depending upon the particular installation used. By rotation of the valve control through an arcuate path ranging from zero to approximately ninety degrees the full fluid flow of the relatively small outlet conduit 19 may be accurately regulated to govern the face temperature of the heater in direct proportion to the angular displacement of the valve control, due to the graduated range of the valve orifice 32 to the total movement over which the valve control means operates. It will be noted at this point that this construction is at variance with other conventional designs in which sufficient heated fluid is admitted after the valve is moved from a fully closed position to a partially opened position to produce maximum delivery of heated air from the heater; and the use of conventional sleeve or poppet valves for throttling the fluid was not found practical due to the close fit required between the valve and its seat to secure the desired control in view of the chemical condition of the water in some geographical areas. In the present invention because of the novel shape of the orifice 32 including the tail portion 33 in the valve disc the fluid is gradually metered through the tapered and undercut side walls of the tail portion over a substantial distance of the total movement of the associated valve control means to produce a straight line temperature characteristic of the water flow, as would be apparent if a graph of the face temperature of the heater and the water flow were plotted, using ordinates of the angular rotation of the valve control means in degrees, and the face temperature of the heater in degrees Fahrenheit. As will be noted from an inspection of Fig. 3, in the lowermost dotted position of the valve orifice, due to the pointed form of the tail of the orifice and the undercut conformation of the side walls thereof, as best shown in Fig. 5, there is substantially no straight through opening in the valve disc 25 to the outlet conduit 19 but rather a side seepage of fluid through the tail of the orifice which literally causes the fluid to be "wire drawn" when in this position. As aforementioned, the valve structure affords particular utility in conjunction with a vehicle heater having an air intake means for induction of fresh outside air in response to forward motion of the vehicle.

Experimentation has determined that a substantially constant face temperature of the heater can be maintained regardless of the vehicle speed with the use of the present valve structure. This is made possible by the fact that as the speed of the vehicle is increased the water pump of the engine circulating system is increased, thereby forcing more heated fluid through the valve orifice in the heater, and keeping in step with this, due to increased vehicle speed, more fresh air is inducted by the air intake means which equalizes the additional heat laden fluid supply. Actually if the vehicle were being driven into a strong head wind, with the valve control adjusted to provide a predetermined face temperature at the heater, and the vehicle was turned and driven in the reverse direction, when the head wind would become a tail wind, the valve control would have to be reset in order to maintain the initial temperature obtained in the original direction of travel. However, while this is not necessary with a thermostatic type valve, the actual temperature differential is a theoretical amount discernable by a thermometer only and not noticeable by the occupants of the vehicle, and since the cost of a comparable thermostatic valve structure is approximately four to six times the amount of the present valve the practical saving is appreciable and the utility at once apparent.

In the valve structures shown in Figs. 6–10 inclusive, there is illustrated a two way or by-pass valve, generally designated 35, and embodying the principles of the present invention. The valve structure 35 may comprise separable body members 36 and 37 threadably secured to each other and forming an inlet portion and an outlet portion, respectively. An annular sealing gasket 38 suitably apertured is seated in the body member 37 and separates the body members 36 and 37 around the periphery thereof adjacent the parting line forming a water-tight seal therebetween. An inlet conduit 40 and outlet conduits 41 and 42 extend from the respective inlet and outlet body members 36 and 37. Axially located within the body portion 37 is an apertured depending threaded collar 44. An annular valve plate 45 is rotatably fitted within the hollow interior of the body portion 36, and an integral axially depending valve stem portion 47 projects through the opening in the collar 44. A packing nut 48 is slidably fitted over the valve stem 47 and threaded into the collar 47 with a packing material between the abutting faces thereof to provide a water tight seal therearound. A coil spring member 50 is compressed in the hollow chamber defined by the body members 36 and 37 between the overlying body member 36 and seated at its lower end on an aligned axial projection 51 on the upper face of the valve plate 45, and constantly urges the valve plate against the underlying gasket 38 and provides a guiding means in rotation of the valve and yieldable resistance to accidental displacement from the adjusted position. As in the prior described valve disc construction, the valve 45 and integral stem may be formed from separate members and assembled in proper relation, in which case a projection of the upper end of the valve stem above the plane of the valve disc would supply a seat for the spring 50.

In the rotatable valve plate 45 in place of the orifice 32, as in valve disc 25, a modified form of opening has been provided. Since the valve structure 35 is concerned principally with a two way or by-pass valve construction the necessity for such a fine accurate metering of the fluid flow is in part obviated, yet due to the relative areas of the fluid flow desired to be controlled or altered the principles of the present invention are applicable. Accordingly, the orifice 55 in this instance comprises a semicircular opening including a communicating rear section formed by converging side walls tangential to the periphery thereof at diametrically opposed points, as best shown in Figs. 9 and 10. The dotted illustrations of the valve orifice in Fig. 8 showing the different positions the valve disc 45 may assume in rotation relative to the mouth of either outlet conduit 41 or 42 and the progressive movement from one outlet conduit to the other to by-pass or change the path of fluid flow. As in the prior valve structure the valve stem 47 has a threaded section on the outer end thereof for reception of a cooperatively threaded direct actuating lever or a remote control means such as a Bowden wire. Likewise, the installation and location may be effected substantially the same as in the original valve structure, however, in the present instance, due to the second outlet conduit which provides the by-pass function of the valve, it is preferably located under the vehicle hood and connected in series with the inlet heater pipe. The unattached outlet conduit of the valve structure may then be joined by a conduit to the suction side of the engine water pump, in which case the valve functions as a by-pass valve, or it may be connected to a second heat exchange structure located at another point in the vehicle body, in which connection it operates as a two way valve. Due to the fact that the present valve structure may operate in a by-pass or two way function, the fluid pressure against the valve disc during the closing or adjusting operation is being gradually transferred or shifted from one outlet conduit to the other, as differentiated from the initially described shut-off valve structure 15, wherein the fluid pressure against the valve disc 25 increased as the valve was closed and thereby necessitated accurate graduation of the shape of the orifice. It is this gradual transfer of pressure fluid from outlet conduit 41 to 42 or vice versa that prevents the system pump from building up pressure against the disc valve and permits the use of a valve orifice of less accurate control and less rapid reduction in port area. This valve may be substituted for most uses in which the previously described valve structure may be employed and obtain somewhat comparable results by extending a by-pass lead from the valve back to a source of suction or lower pressure in the fluid system, however, it has the objection of being more expensive and requiring added plumbing which increases the possibility of leakage in the system.

It will, of course, be apparent to those skilled in the art that the construction of a valve structure in accordance with the present invention is capable of being modified in considerable detail from that of the particular forms shown by way of illustration and, accordingly, it will be understood that formal changes may be made in the specific embodiments of the invention described without departing from the spirit and substance of the broad invention, the scope of which is commensurate with the appended claim.

What I claim is:

A valve structure, comprising separable body members having a sealing gasket interposed therebetween, an inlet conduit axially connected to one body member and an outlet conduit connected to the other body member, one of said body members being provided with a pocket, a rotatable plate valve received in said pocket, a spring in said pocket disposed axially with respect to the axis of said inlet conduit and the axis of said plate valve so that the pressure of the fluid entering the inlet conduit will assist the spring in maintaining the valve seated, means connecting the body members together and compressing the spring for seating the valve on the gasket, said valve having an opening formed therein which is enlarged at one end and terminating in a gradual taper at the other end for forming a metering discharge passage, said opening being adapted to register with the outlet conduit on rotation of the valve and means for rotating said valve.

HOWARD J. FINDLEY.